United States Patent [19]

Wagner et al.

[11] Patent Number: 5,762,244
[45] Date of Patent: Jun. 9, 1998

[54] UTILITY RACK

[75] Inventors: Paul N. Wagner, Warsaw; Nicholas R. Bilello, South Bend; Del O. Littrell, Elkhart, all of Ind.

[73] Assignee: Bornemann Products, Inc., Bremen, Ind.

[21] Appl. No.: 754,852

[22] Filed: Nov. 22, 1996

[51] Int. Cl.⁶ ........................................................ B60P 7/08
[52] U.S. Cl. ........................................ 224/281; 244/118.1
[58] Field of Search ............................ 224/401, 281; 244/118.1; 108/44; 296/65.1; 248/503

[56] References Cited

U.S. PATENT DOCUMENTS

| 4,457,649 | 7/1984 | Vogg et al. | 244/118.1 X |
| 5,046,913 | 9/1991 | Domek et al. | 248/503 X |
| 5,421,539 | 6/1995 | Carducci | 244/118.1 |

FOREIGN PATENT DOCUMENTS 4003943  8/1991  Germany ............................ 224/281

*Primary Examiner*—Renee S. Luebke
*Attorney, Agent, or Firm*—Baker & Daniels

[57] ABSTRACT

A releasably mounted utility rack for organizing cargo in the cargo area of a work vehicle includes a frame which supports storage bins and a pair of spaced mounting rails. The mounting rails carry spaced-apart latches which correspond to the pre-existing seat catches integrally mounted to the floor of the vehicle. Each latch is pivotally mounted to its corresponding rail and pivots between an unlatched position and a latched position wherein the latch interlocks with a seat catch. Each latch also includes a retainer for retaining the latch in its latched position.

17 Claims, 3 Drawing Sheets

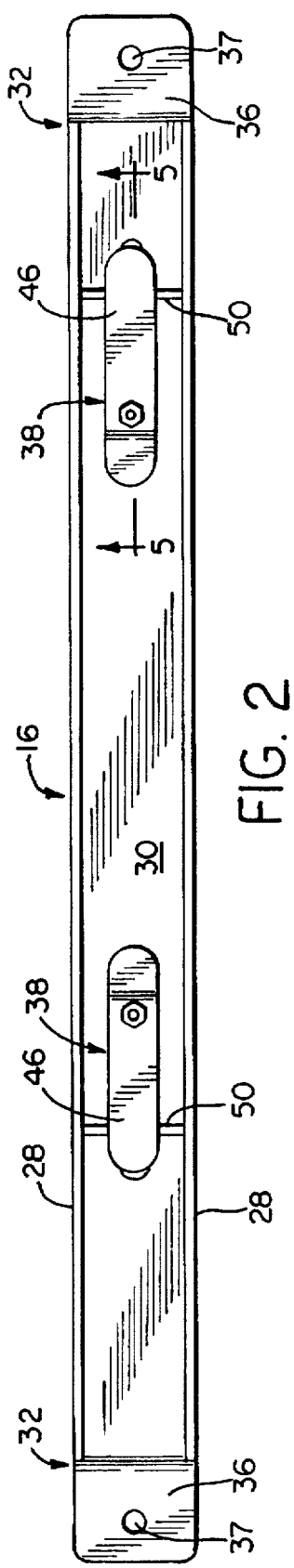
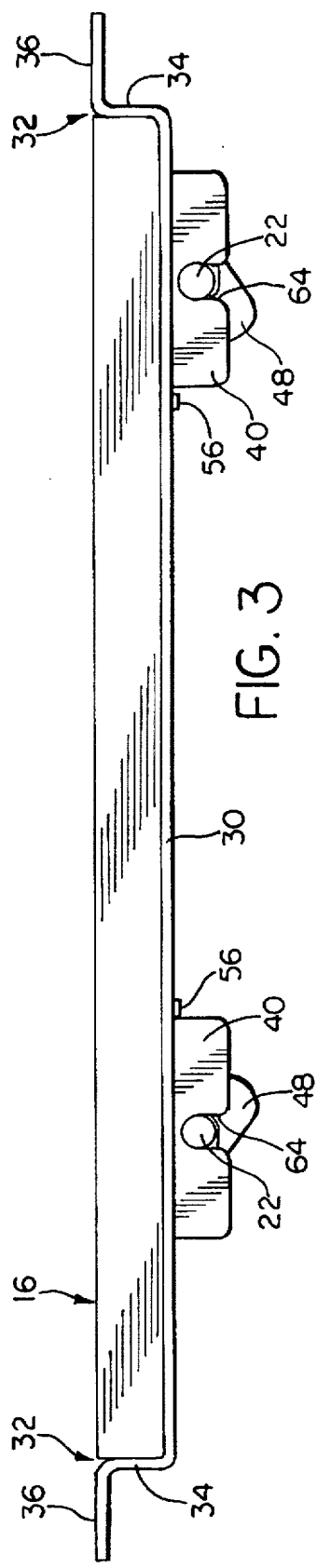
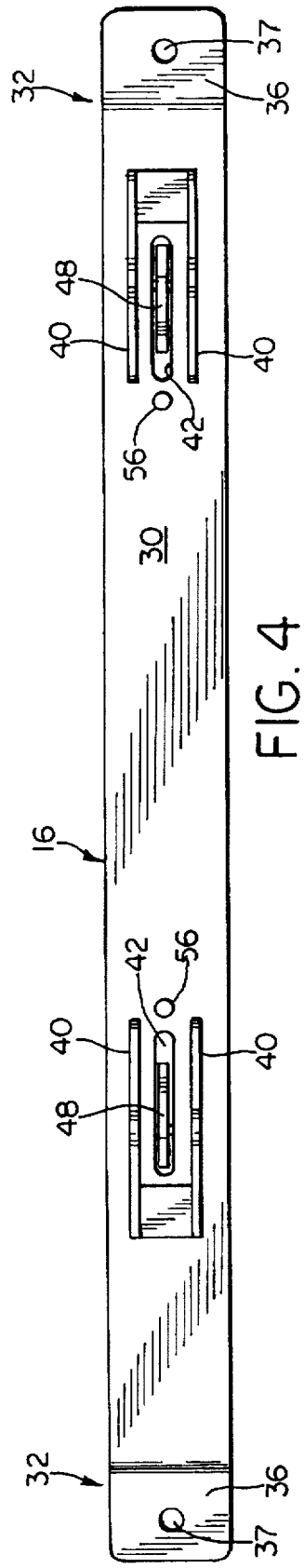
FIG. 2
FIG. 3
FIG. 4

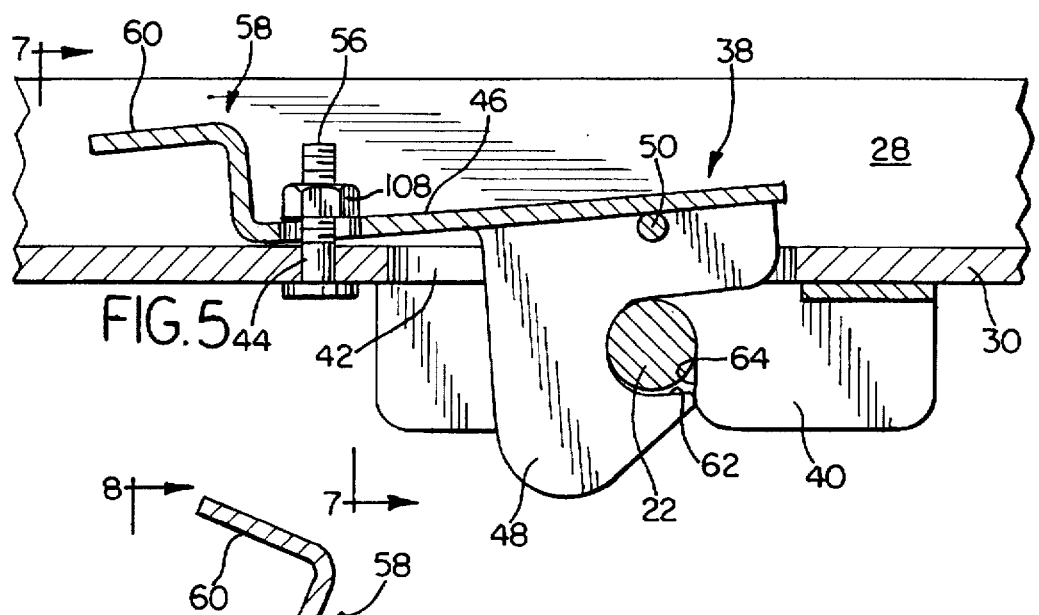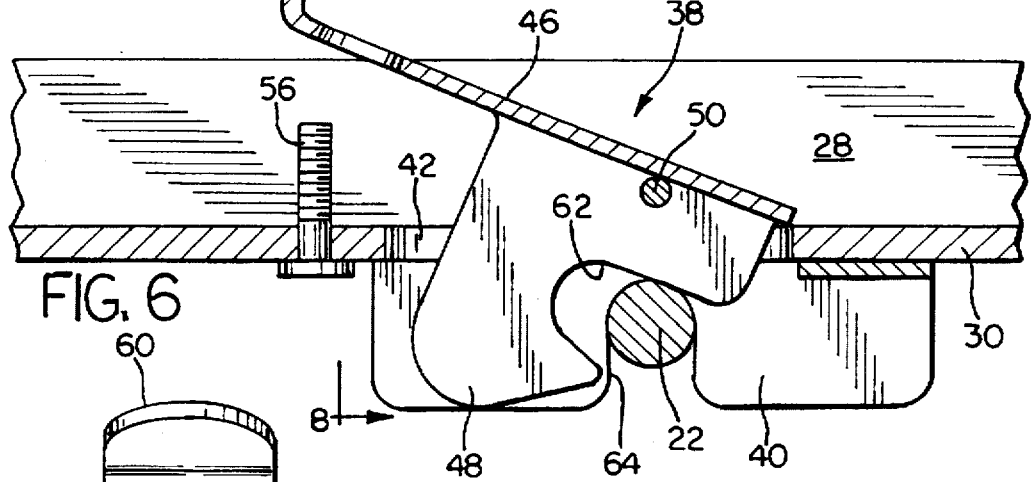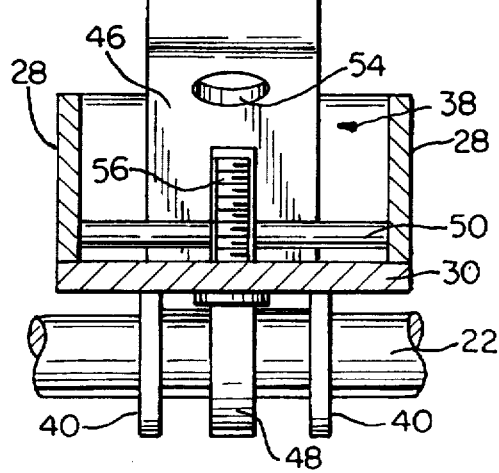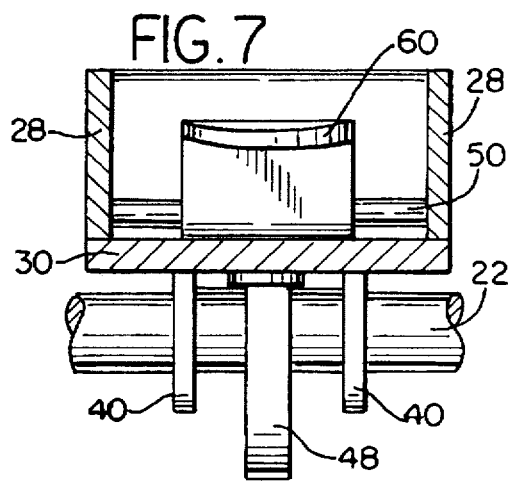

UTILITY RACK

FIELD OF THE INVENTION

The present invention relates in general to a utility rack or storage cage for use in the cargo area of a vehicle, and in particular to a utility rack having a tie-down rail for releasably securing the utility rack to seat catches pre-existing in the floor of the vehicle.

BACKGROUND OF THE INVENTION

Many laborers and servicemen transport tools and supplies to the worksite in work vehicles. In order to more efficiently transport and access the tools and supplies, the work vehicles employed often contain utility racks or storage cages which support storage bins or containers. Frequently, these work vehicles are standard vans which have been converted into utility vehicles containing such racks. Heretofore, the van rear bench seats were removed and the utility rack was bolted or otherwise fastened to the van floor. This method of installing a utility rack is undesirable because it requires drilling into the vehicle floor. Drilling through the vehicle floor is dangerous and may void certain long-term vehicle warranties. Also, the resulting damage decreases the resale value of the vehicle, even if the seller undertakes the expense and labor of repairing the holes in the floor before resale of the vehicle.

SUMMARY OF THE INVENTION

The present invention provides a utility rack for organizing supplies and tools in the cargo area of a work vehicle which is releasably mounted to the seat catches exposed in the floor of the vehicle upon removal of the rear seats from the cargo area. The utility rack includes a frame which supports cargo bins, and a pair of spaced-apart rails attached to the frame in alignment with the vehicle seat catches. The rails carry latches which pivot into interlocking engagement with seat catches to secure the rails to the floor, thereby securing the utility rack within the cargo area. The rails also include retaining fasteners which hold the latches into interlocked engagement with the seat catches.

Accordingly, an object of the present invention is to provide a utility rack which is reusable and easily installed in a vehicle.

Another object of the invention is to provide a utility rack which releasably mounts to the pre-existing seat catches of a standard van.

Yet another object of the present invention is to provide a removably mounted utility rack which can be installed into and removed from a vehicle without damaging the vehicle.

BRIEF DESCRIPTION OF THE DRAWINGS

The above-mentioned and other objects and advantages of this invention, and the manner of attaining them, will become more apparent and the invention will be better understood by reference to the following description of embodiments of the invention taken in conjunction with the accompanying drawings, wherein:

FIG. 2 is a top plan view of a mounting rail as included in the utility rack shown in FIG. 1;

FIG. 3 is a side elevational view of the mounting rail of FIG. 2;

FIG. 4 is a bottom plan view of the mounting rail of FIG. 2;

FIG. 5 is a partially fragmented cross-sectional view taken substantially along line 5—5 of FIG. 2 showing the mounting rail in a latched position;

FIG. 6 is a partially fragmented cross-sectional view similar to FIG. 5 showing the mounting rail in an unlatched position;

FIG. 7 is a cross-sectional view taken substantially along line 7—7 of FIG. 5; and FIG. 8 is a cross-sectional view taken substantially along line 8—8 of FIG. 6.

Figure 1:
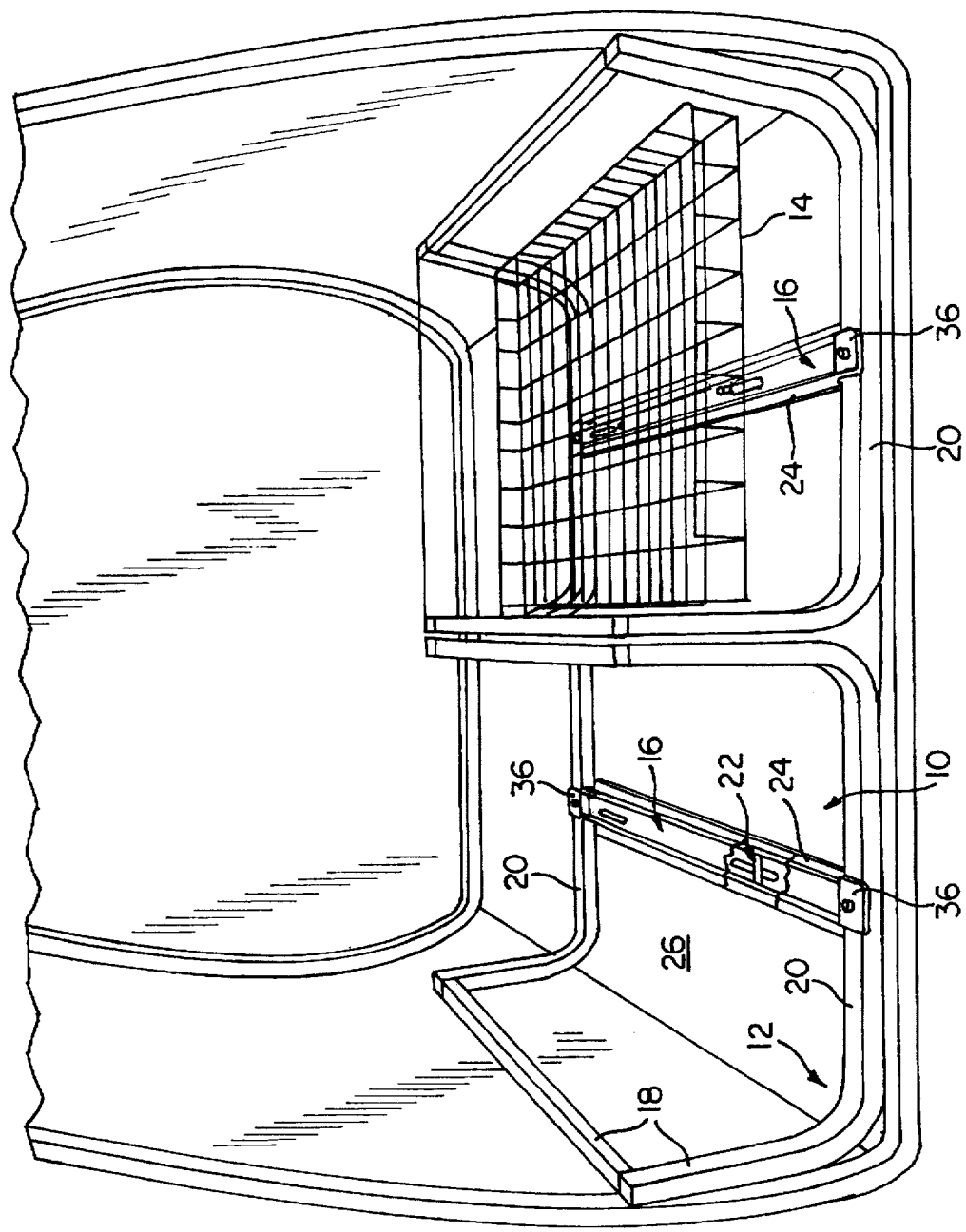
FIG. 1 is a partially fragmented perspective view of the rear of a work vehicle with a utility rack according to the present invention installed therein.

Corresponding reference characters indicate corresponding parts throughout the several views. Although the drawings represent embodiments of the present invention, the drawings are not necessarily to scale and certain features may be exaggerated in order to better illustrate and explain the present invention.

DESCRIPTION OF THE INVENTION

The embodiments disclosed below are not intended to be exhaustive or to limit the invention to the precise forms disclosed. Rather, the embodiments selected for the description of the invention are disclosed so that others skilled in the art may utilize their teachings.

FIG. 1 shows utility rack 10 mounted in the rear cargo area of a standard van having a floor 26 with parallel longitudinally extending channels 24 containing spaced apart seat catches 22 of a standard configuration. Utility rack 10 includes a frame, generally referred to as 12, a cargo bin 14, and a pair of mounting rails 16. For simplicity, frame 12 is shown truncated with only one cargo bin 14. Of course, a typical frame 12 would extend approximately to the top of the cargo area and support several cargo bins 14. Frame 12 generally includes a plurality of frame members 18 which form multi-level shelving units for supporting the cargo bins 14. Frame 12 also includes lower cross-members 20 which are attached to mounting rails 16 as described below.

Mounting rails extend perpendicularly between lower cross members 20 and are mounted thereto using standard fasteners which extend through flanges 36 into cross members 20. Rails 16 are mounted in parallel relationship at a predetermined spacing which corresponds to spacing between recessed channels 24.

Referring now to FIGS. 2 through 4, mounting rails 16 include a pair of parallel sidewalls 28 connected together by a bottom web 30 which turns upwardly at each end 32 to form end walls 34 and outwardly to form flanges 36. An opening 37 is formed in each flange 36 to receive the fastener for attaching rail 16 to cross members 20 as described above. A pair of latches, generally referred to as 38, are disposed between sidewalls 28. The spacing between latches 38 corresponds to the standard spacing between seat catches 22. A pair of parallel, spaced apart feet 40 extend downwardly from bottom wall 30 adjacent each of the latches. As shown in FIG. 3, each foot 40 includes a notch 64 for aligning foot 40 onto seat catch 22. Bottom wall 30 forms an elongated slot 42 at each latch 38 which is positioned between a corresponding pair of feet 40 as best shown in FIG. 4. Bottom wall 30 also defines a bore 44 (FIG. 5) adjacent each slot 42 which receives a threaded fastener as further described below.

Since the structure and operation of each latch 38 is substantially the same, only one latch is described below. Referring now to FIGS. 5 through 8, latch 38 includes a lever arm 46 and a latching member or finger 48 which extends perpendicularly downwardly from the lever arm 46 through slot 42. Latch 38 pivots on the pivot rod 50 which extends through finger 48 between sidewalls 28. Finger 48 includes a notch 62 adapted to engage seat catch 22. Lever arm 46 includes a free end 58 which defines a bore 54. Bore 54 is substantially aligned with an upwardly projecting fastener 56 which is permanently mounted through bore 44 using standard techniques. Free end 58 also includes an upturned handle portion 60 for operating latch 38 as described in detail below.

Mode of Operation

The work vehicle is prepared for the installation of utility rack 10 by removing the rear bench seats from their respective seat catches 22 in the standard manner. Once mounting rails 16 are attached to frame 12 at locations along cross members 20 corresponding to the spacing between channels 24 in the vehicle floor 26, the utility rack 10 may be installed into vehicle cargo area. Mounting rails 16 are positioned over channels 24 and utility rack 10 is moved toward the rear of the vehicle until notches 64 in feet 40 align with seat catches 22. Utility rack 10 then drops downwardly onto seat catches 22 until feet 40 engage the bottom of recessed channels 24. The installer attaches utility rack 10 to floor 26 by grasping handle 60 of lever arm 46 and pivoting latch 38 downwardly toward bottom web 30 from its upwardly pivoted unlatched position (FIG. 6) to its latched position (FIG. 5). As latch 38 pivots downwardly, finger 48 pivots within slot 42 until seat catch 22 is engaged within notch 62. As should be apparent from the foregoing, a groove or depression must be present below seat catch 22 in recessed channel 24 to accommodate the portion of finger 48 which extends below feet 40 when latch 38 is moved into its latched position as shown in FIGS. 5 and 7. As lever arm 48 moves toward bottom web 30, fastener 56 threads through bore 54 of lever arm 48. When latch 38 is in its latched position (FIG. 5 and FIG. 7), a nut 108 is threaded onto fastener 56 to retain latch 38 in its latched position. The procedure is repeated for each latch 38. As such, rails 16, and therefore utility rack 10, are prohibited from moving longitudinally by notches 64 in feet 40 and vertically by notches 62 in fingers 48.

Utility rack 10 is removed from the vehicle by removing the retaining nuts 108 from fasteners 56, and lifting the lever arm 46 of each latch 38 upwardly away from bottom web 30. Finger 48 pivots about pivot rod 50 within slot 42 until latch 38 reaches its unlatched position (FIG. 6 and FIG. 8). After each latch 38 is moved into its unlatched position, utility rack 10 may be lifted upwardly until seat catches 22 are no longer within notches 64 of feet 40. Utility rack 10 is then removed from the vehicle. The vehicle seats may then be replaced and the vehicle resold for other purposes.

While this invention has been described as having preferred embodiments, the present invention can be. further modified within the spirit and scope of this disclosure. This application is therefore intended to cover any variations, uses or adaptations of the invention using its general principles. Further, this application is intended to cover such departures from the present disclosure as come within known or customary practice in the art to which this invention pertains and which fall within limits of the amended claims.

We claim:

1. A utility rack for organizing cargo in the cargo area of a vehicle, said utility rack being releasably mounted to seat catches integral to the floor of said cargo area, said utility rack comprising:

a frame;

cargo bins supported by said frame for containing the cargo; and a rail mounted to said frame for supporting said frame within said cargo area, said rail including a first latch pivotally movable between an unlatched position and a latched position wherein said first latch interlocks with one of said seat catches thereby securing said rail to the floor, and means for retaining said first latch in said latched position, said rail further including a pair of substantially parallel sidewalls having a web extending there between, said web defining an elongated slot therethrough, said first latch extending through said slot.

2. The utility rack of claim 1 wherein said rail extends between said one seat catch and another seat catch spaced apart from said one seat catch, said rail further comprising a second latch pivotally movable between an unlatched position and a latched position wherein said second latch interlocks with said other seat catch.

3. The utility rack of claim 2 wherein said first latch is disposed adjacent one end of said rail and said second latch is disposed adjacent the other end of said rail.

4. The utility rack of claim 1 further comprising a pivot rod extending between said sidewalls above said slot, said first latch including a lever arm for pivoting said latch about said pivot rod between said unlatched position and said latched position having a finger depending therefrom, said finger extending through said slot to interlock said seat catch when said latch is in its latched position.

5. The utility rack of claim 4 wherein said lever arm includes a bore, said retaining means including a fastener connected to said web in alignment with said bore whereby when said latch is in its said latched position, said fastener extends through said bore to retain said latch.

6. The utility rack of claim 1 further comprising spacers extending downwardly from said rail to space said rail above the vehicle floor thereby vertically aligning said first latch with said one seat catch.

7. The utility rack of claim 6 wherein said each of said spacers include an alignment notch for receiving said one seat catch thereby horizontally aligning said first latch with said one seat catch.

8. A utility rack for organizing cargo in the cargo area of a vehicle, said utility rack being releasably mounted to seat catches integral to the floor of said cargo area, said utility rack comprising:

a frame;

cargo bins supported by said frame for containing the cargo; and a base mounted to said frame for supporting said frame within said cargo area, said base including a first latch pivotally movable between an unlatched position and a latched position wherein said first latch interlocks with one of said seat catches thereby securing said base to the floor, and means for retaining said first latch in said latched position, spacers extending downwardly from said base, each of said spacers including an alignment notch for receiving said one seat catch thereby horizontally aligning said first latch with said one seat catch.

9. The utility rack of claim 8, wherein said seat catches extend across recesses in said floor of said cargo area, and said spacers extend into said recesses.

10. The utility rack of claim 8, wherein said base extends between said one seat catch and another seat catch spaced apart from said one seat catch, said base further comprising a second latch pivotally movable between an unlatched position and a latched position wherein said second latch then locks with said other seat catch.

11. A storage cage for a work vehicle having removable seats coupled to seat catches built in to the floor of the vehicle, said storage cage comprising:

a frame;

a container mounted to said frame;

a base connected to said frame for securing said frame to said floor of the vehicle after said vehicle seats have been removed, said base including alignment means for positioning said base onto said seat catches, latching means for releasably latching said base to said seat catches, and locking means for locking said latching means in a latched position, said alignment means including feet extending downwardly from said base adjacent said seat catches to space said base above said floor, each of said feet having an alignment notch for receiving a said seat catch when said base is positioned onto said seat catches.

12. The storage cage of claim 11 wherein said base includes a pair of rails, each of said rails extending between a pair of longitudinally aligned seat catches.

13. The storage cage of claim 11 wherein said latching means includes pairs of latches pivotally mounted to said base, each said latch being pivotally moveable between said latched position and an unlatched position.

14. The storage cage of claim 11 wherein said latching means includes individually operable latches corresponding to each said seat catch, said latches being mounted to said base and pivotal between a latched position and an unlatched position, each of said latches including a finger which pivots under a corresponding seat catch when said latch is its said latched position, said finger thereby cooperating with the alignment notches of said feet adjacent said corresponding seat catch to secure said frame to said floor of the vehicle.

15. The storage cage of claim 14 wherein each said latch includes a lever arm for operating said latch, said lever arm having a free end defining a bore therethrough for cooperating with said locking means when said latch is in its said latched position.

16. The storage cage of claim 15 wherein said locking means includes fasteners corresponding to said latches, each of said fasteners extending through a corresponding lever arm bore when said latch is in its said latched position.

17. A vehicle utility rack for removable attachment to seat catches integrally mounted within a recess in the floor of the vehicle, said rack comprising:

a frame for supporting storage bins;

an elongated rail attached to said frame for connected said frame to said floor of the vehicle, said rail including sidewalls and a bottom wall extending between said sidewalls, said bottom wall having a slot extending therethrough;

a pair of spacers extending downwardly from said bottom wall for placement into said floor recess to engage said floor, said spacers being spaced apart from one another thereby defining a gap, each said spacer having a notch for receiving a said seat catch when said spacer engages the floor;

a latch mounted to said rail between said sidewalls for pivotal movement between an unlatched position and a latched position, said latch including a finger extending through said bottom wall slot for rotatable movement within said gap to interlock with said seat catch when said latch is in said latched position, and retaining means for retaining said latch in said latched position.

* * * * *